April 11, 1944.   E. J. BEAULIEU ET AL   2,346,285
CONVEYER SYSTEM
Filed April 10, 1942   2 Sheets-Sheet 2

INVENTORS
E. J. BEAULIEU
L. E. BENNETT
BY Harry L. Duft
ATTORNEY

Patented Apr. 11, 1944

2,346,285

UNITED STATES PATENT OFFICE 2,346,285

CONVEYER SYSTEM

Ezra J. Beaulieu, Downers Grove, and Loren E. Bennett, Hinsdale, Ill., assignors to Western Electric Company, Incorporated, New York, N. Y., a corporation of New York Application April 10, 1942, Serial No. 438,453

5 Claims. (Cl. 198—38)

This invention relates to conveyer systems, and more particularly to a system for conveying work carriers selectively to a plurality of work stations.

Objects of the invention are to provide a simple, inexpensive and efficient conveyer system for conveying articles selectively to a plurality of stations.

In accordance with one embodiment of the invention, a conveyer system is provided in which articles supporting carriers are equipped with pilot pins for cooperating with fixed deflectors to selectively divert the carriers from a main conveyer to branch conveyers. The pilot pins also serve to selectively transfer the work carriers from the branch conveyers into pre-selected work stations. The work carriers are equipped with circular heel plates at their ends which permit sharp 90° turns of the carriers from one conveyer to another.

Other features of the invention will become apparent from the following detailed description when read in conjunction with the accompanying drawings, in which Fig. 1 is a plan view of a conveyer system embodying the invention;

Figure 1:
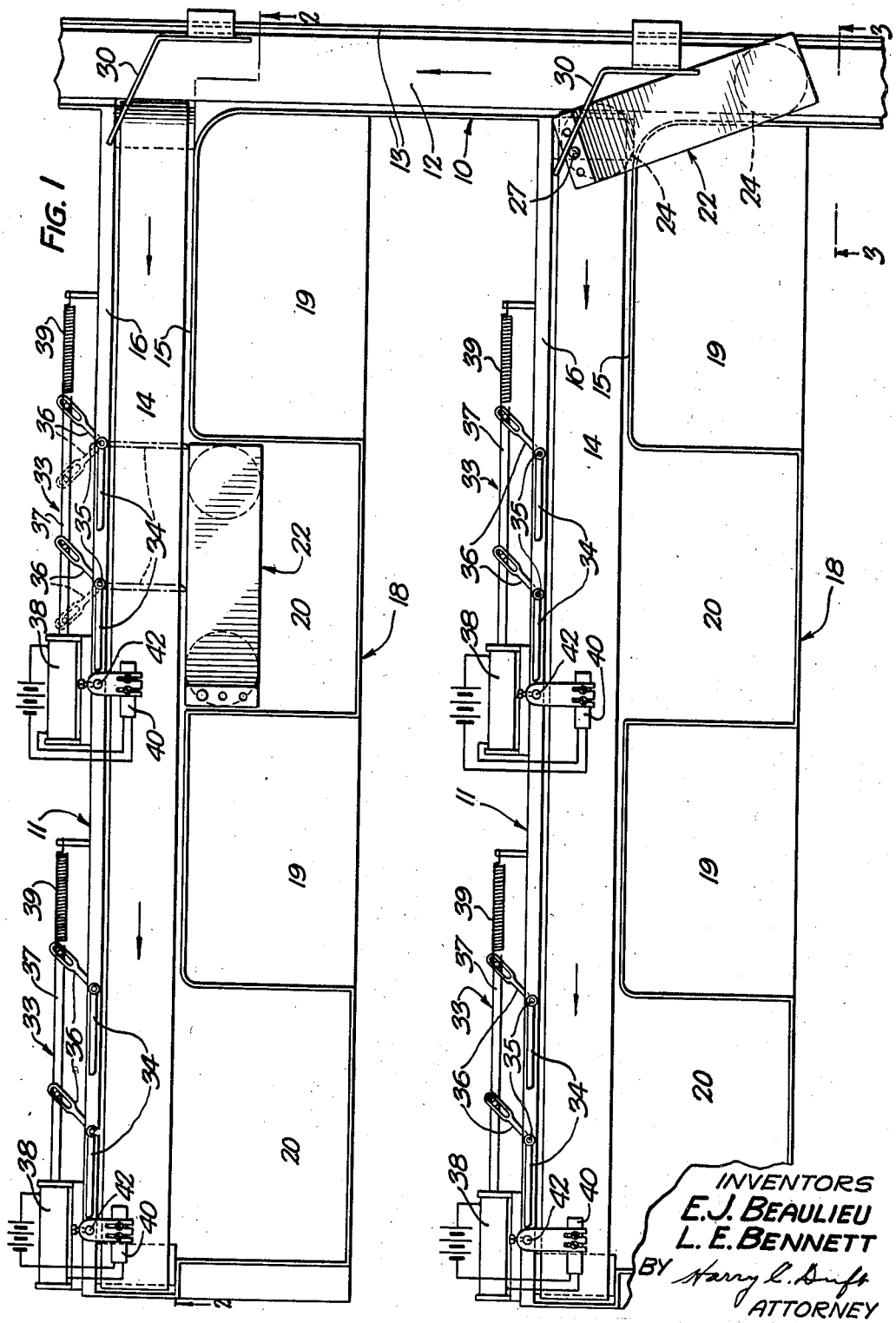
Figure 2:
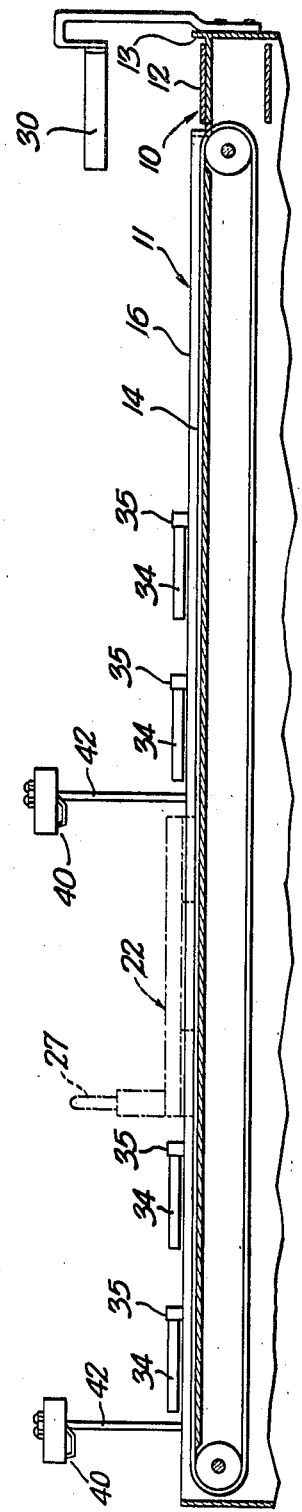
Fig. 2 is a vertical section taken on line 2—2 of Fig. 1.

The conveyer system illustrated in the drawings comprises a main conveyer 10 and a plurality of branch conveyers 11, 11, only two of which are shown. These conveyers may be of any well-known type, those illustrated being of the endless belt type. The main conveyer comprises an endless belt 12, which is driven continuously between guide rails 13—13, and each of the branch conveyers comprises an endless belt 14 which is driven continuously between guide rails 15 and 16. Suitable means (none shown) is provided for driving the several conveyer belts in the directions indicated by the arrows in Fig. 1.

Laterally adjacent to each of the branch conveyers is a work table or bench 18. Each work table comprises two or more work stations 19, 19 and the same number of work receiving and storing bins 20, 20, one for each work station.

Figure 4:
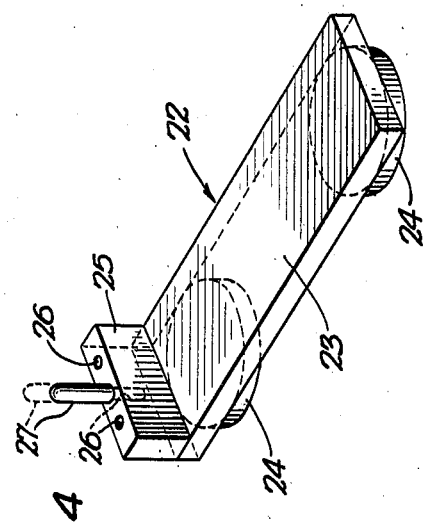
Fig. 4 is a perspective view of one of the work carriers.

The main conveyer 10 is adapted to convey articles or work pieces to the branch conveyers 11 which carry the work pieces to the several storage bins. The work pieces (none shown) are placed on skids or carriers 22, 22. As best shown in Fig. 4, each of these work supporting carriers comprises a platform 23, which is provided at each end with a circular heel plate 24. An upstanding block 25 is provided at the forward end of the carrier and a series of holes 26, 26 is provided in this block for selectively receiving a pilot pin 27 for determining the destination of the carrier in the manner hereinafter described.

Figure 3:
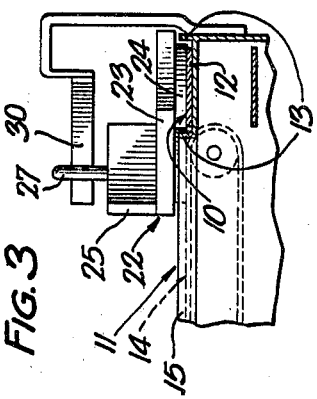
Fig. 3 is a fragmentary vertical section taken on line 3—3 of Fig. 1.

Stationary deflectors 30, 30 are mounted above the main conveyer, one adjacent to each branch conveyer. These deflectors cooperate with the pilot pins 27 placed on the work carriers to divert the work carriers from the main conveyer onto the branch conveyers, as illustrated in Figs. 1 and 3. It will be noted that the deflectors are mounted at different positions transversely of the main conveyer belt so that they are effective for diverting only those carriers having correspondingly positioned pilot pins. The circular heel plates 24 of the carriers permit sharp 90° turns of the relatively long carriers from the main conveyer to the branch conveyers, since the heel plates are of sufficient thickness to permit the carrier platforms to pass freely over the top edges of the conveyer guide rails at the turns.

As shown in Fig. 1, the storage bins 20 are disposed laterally adjacent to one side of the branch conveyers. Mounted adjacent to the opposite side of the branch conveyers are a plurality of transfer mechanisms 33, 33, one for each storage bin. These transfer mechanisms transfer the work carriers from the branch conveyers into the storage bins. The several transfer mechanisms are identical in construction and operation. Each comprises a pair of oscillatory arms 34, 34 fixed to vertical rock shafts 35, 35. Attached to these shafts are crank arms 36, 36, which are operatively connected by a bar 37 to the plunger of a solenoid 38. The arms 34 are normally positioned out of the path of work carriers moving along the branch conveyers, as shown in full lines in Fig. 1. However, when one of the solenoids 38 is energized, it swings the associated transfer arms 34 in counter-clockwise directions and against the opposing force of restoring springs 39, 39 to the positions indicated in broken lines in Fig. 1. Thus, a work carrier, which at the time may be positioned on the branch conveyer in front of the transfer arms, is pushed into the storage bin by the transfer arms.

Each transfer mechanism is controlled by a normally open switch 40, which controls the energizing circuit of the transfer mechanism operating solenoid 38. Each of these switches is mounted on a vertical post 42 so that it is adjustable vertically on the post and laterally of the conveyer belt 14. The switches are laterally positioned so that they will be closed by the pilot pins 27 on the work carriers as the latter travel along the respective branch conveyers. Thus, all of the switches above any one of the branch conveyers will be in the same lateral position, but in a different lateral position than the switches above the other branch conveyers. Also, each of the several switches above any one of the conveyers is positioned at a different height than the remaining switches above the same conveyer so that each switch is closed only by pilot pins of a certain height. Thus, the work carriers may be routed selectively to the several storage bins simply by placing pilot pins of the proper heights in the proper holes 26 of the carriers.

In the operation of the above-described conveyer system, a pilot pin 27 of the proper height is placed in one of the holes 26 of each work carrier in accordance with the position of the transfer mechanism control switch 40 that is associated with the particular storage bin 20 to which the carrier is to be conveyed. The carrier is then placed on the main conveyer from which it is diverted onto the proper branch conveyer 11 by means of the associated stationary deflector 30 with which the pilot pin on the carrier cooperates to deflect the carrier onto the branch conveyer, as shown in Figs. 1 and 3. The branch conveyer conveys the carrier to the proper storage bin 20. As the carrier arrives in front of this storage bin, the pilot pin on the carrier closes the switch 40, whereupon the transfer mechanism 33 is operated to transfer the carrier into the storage bin. Thus, the pilot pins on the carriers perform the double function of first cooperating with the stationary deflectors 30 to divert the work carriers onto the proper branch conveyer, and then actuating the proper transfer mechanisms to push the carriers into the proper storage bins.

It should be understood that the invention is not limited to the specific embodiments thereof herein illustrated and described, but is capable of other applications within the scope of the appended claims.

What is claimed is:

1. A conveyer system comprising a main conveyer, a branch conveyer extending from said main conveyer, an article supporting carrier adapted to be conveyed by said conveyers, said conveyers having side guide rails, and said carrier comprising an elongated platform having circular heel plates at its ends for elevating said platform above said guide rails and for cooperating with the guide rails to facilitate the diversion of the carrier from the main conveyer to the branch conveyer.

2. A conveyer system comprising a main conveyer, a branch conveyer extending at an angle from said main conveyer, article supporting carriers comprising elongated platforms adapted to be conveyed by said conveyers, guide rails on opposite sides of said conveyers, and circular heel plates at opposite ends of said platforms for elevating said platforms above said guide rails and for cooperating with said guide rails to facilitate the diversion of the carriers from the main conveyer to the branch conveyer.

3. A conveyer system comprising a plurality of interconnected conveyers arranged with some of the conveyers disposed angularly with respect to adjoining conveyers, a plurality of article supporting carriers adapted to be conveyed by said conveyers, guide rails on opposite sides of each of said conveyers, means for diverting carriers from one to another of said conveyers, each of said carriers comprising an elongated platform having heel plates at opposite ends thereof for elevating said platform above said guide rails and for cooperating with said guide rails to facilitate the diversion of said carriers from one to another of said conveyers.

4. A conveyer system comprising a main conveyer, a plurality of branch conveyers extending from said main conveyer, a plurality of stations laterally adjacent to each branch conveyer, a transfer mechanism opposite each station, a plurality of article supporting carriers adapted to be conveyed by said conveyers, deflectors on said main conveyer, one adjacent to each branch conveyer, said deflectors being disposed at different positions transversely of said main conveyer, pilot pins on said carriers adjustable transversely thereof for cooperating with said deflectors to divert the carriers from the main conveyer onto pre-selected branch conveyers, said pilot pins being of different height, and means at each station mounted for selective actuation by said pilot pins in accordance with their respective heights for operating pre-selected transfer mechanisms to transfer the carriers from the branch conveyers into pre-selected stations.

5. A conveyer system comprising two interconnected conveyers arranged with one of said conveyers angularly disposed with respect to the other, an article supporting carrier adapted to be conveyed by said conveyers, guide rails along opposite sides of said conveyers, and means for diverting said carrier from one to the other of said conveyers, said carrier comprising an elongated platform having heel pieces at opposite ends thereof for elevating said platform above said guide rails and for cooperating with said guide rails to facilitate the diversion of said carrier from one to the other of said conveyers.

EZRA J. BEAULIEU.
LOREN E. BENNETT.